Jan. 1, 1946. H. H. TRAIL 2,392,013
ONE-WAY BRAKE
Filed July 10, 1944
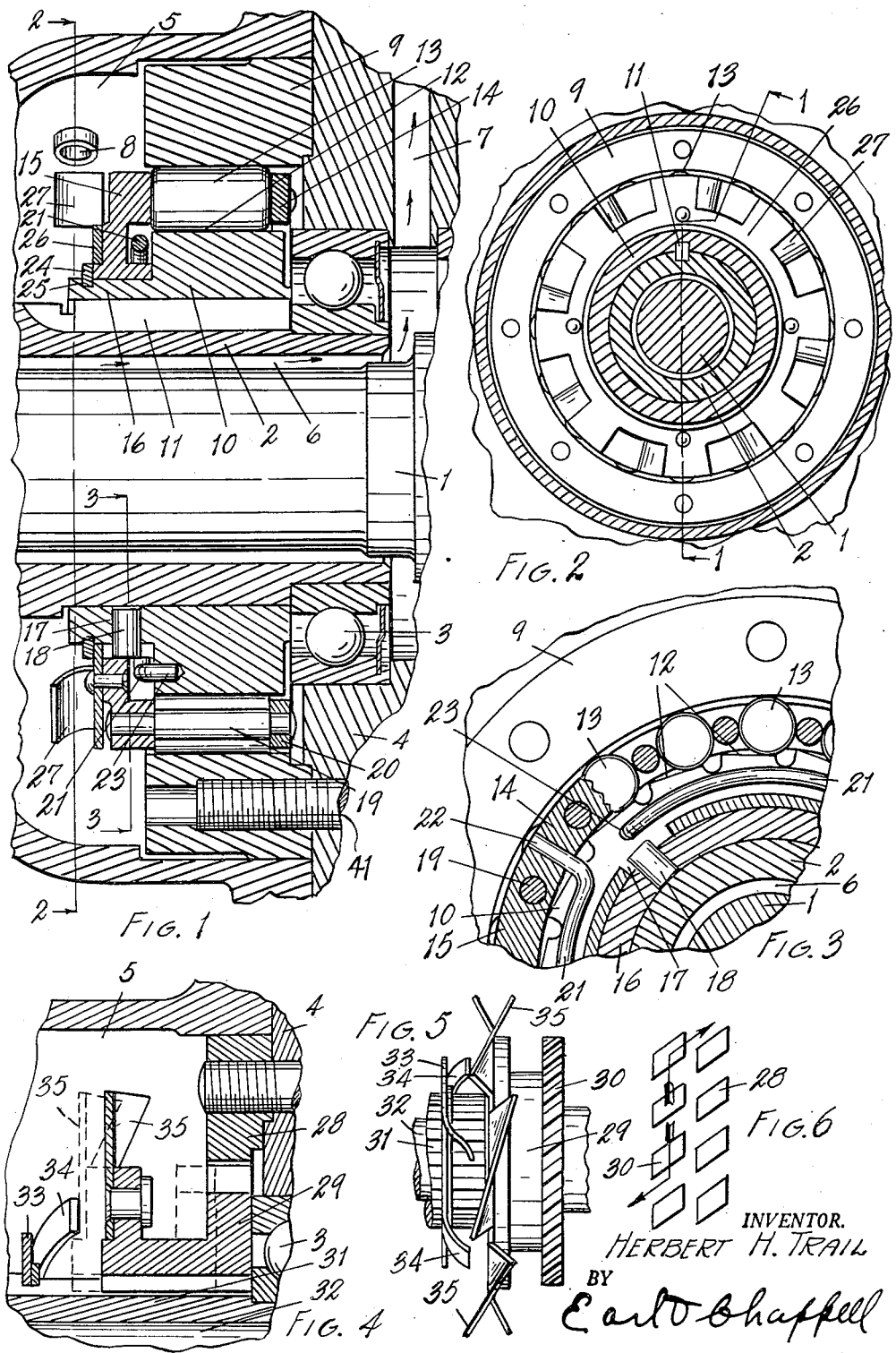
INVENTOR.
HERBERT H. TRAIL
BY
ATTORNEYS.

Patented Jan. 1, 1946

2,392,013

UNITED STATES PATENT OFFICE 2,392,013

ONE-WAY BRAKE

Herbert H. Trail, Kalamazoo, Mich., assignor to Fuller Manufacturing Company, Kalamazoo, Mich.

Application July 10, 1944, Serial No. 544,277

8 Claims. (Cl. 188—81)

This invention relates to improvements in one-way brakes.

The main objects of this invention are:

First, to provide an overrunning brake of the wedging roller type in which the wedging rollers are effectively retained in retracted or brake disengaging position during the rotation of the rotatable member of the brake thereby avoiding friction and wear and the heating of the brake members as a result of friction.

Second, to provide a structure having these advantages which is simple and compact and highly efficient for the purposes intended.

Third, to provide an overrunning brake in which the movable member actuated to engaged position by spring means is automatically retracted against the action of the spring when the rotatable member is rotating at substantial speed.

Objects relating to details and economies of the invention will appear from the description to follow. The invention is defined and pointed out in the claims.

A preferred embodiment of the invention is illustrated in the accompanying drawing, in which:

Fig. 1 is an enlarged fragmentary view partially in section on line 1—1 of Fig. 2 of a structure embodying the features of my invention.

Fig. 2 is a fragmentary view in transverse section on line 2—2 of Fig. 1.

Fig. 3 is an enlarged fragmentary view partially in section on line 3—3 of Fig. 1.

Fig. 4 is an enlarged fragmentary view of a modified form or embodiment of my invention mainly in longitudinal section, the rotatable brake member being shown in its retracted or disengaged position by dotted lines.

Fig. 5 is a fragmentary elevational view showing details of the embodiment of my invention shown in Fig. 4.

Fig. 6 is a diagrammatic view illustrating the relation of the movable and fixed jaw elements of the structure shown in Figs. 4 and 5.

The embodiment of my invention illustrated is an adaptation to a hydraulic torque converter such as illustrated in my copending application, Serial No. 544,275, filed July 10, 1944. I have, however, in this drawing illustrated only portions of such a structure as are directly concerned with the overrunning brake of my present invention.

In the accompanying drawing, I represents the main shaft and 2 a tubular surrounding shaft provided with a bearing 3 carried by the housing 4. The housing 4 is designed to provide a fluid chamber 5 which, in the embodiment illustrated, is part of the fluid circulating system of a hydraulic torque converter.

The shafts 1 and 2 are spaced to provide a discharge passage 6 connected to a cooling unit through the passage 7, the cooling unit being connected to the chamber 5 through a connection indicated at 8, the chamber 5, as stated, being part of the circulating system. However, so far as my present invention is concerned, the fluid chamber 5 is provided to receive certain parts and has a direct functioning relation to the brake of the invention.

In this embodiment illustrated, the fixed or roller raceway member 9 is mounted within the fluid chamber 5 of the housing 4 and secured to the housing 4 by cap screws, one of which is shown at 41 at the lower right of Fig. 1, while the coacting rotatable brake member 10 is connected to rotate with the shaft 2 by means of the spline or key 11.

The member 10 is provided with a plurality of cams 12 coacting with the rollers 13 in a well understood manner. The rollers are provided with a cage 14 which consists of an annular member 15 mounted upon the hub-like projection 16 of the member 10 and having a slot 17 receiving the pin 18 on the hub portion 16 thereby providing a lost motion connection for the cage member to the brake member 10. The cage member carries a plurality of pins 19 disposed between the rollers and connected at their inner ends by the ring 20.

The annular spring 21 is connected at 22 to the cage and its other end is connected at 23 to the rotatable brake member so that the cage is rotated with the brake member although it has a lost motion connection thereto. In the embodiment illustrated, the cage is retained by the split snap ring 24 engaging the groove 25 in the hub of the clutch member 10.

On the cage member I mount a ring 26 having a plurality of vanes 27 thereon, the vanes projecting into the fluid chamber 5 so that on the rotation of the rotatable brake member at a substantial speed, the vanes act to overcome and counteract the spring 21 so that the rollers are fully disengaged from the fixed brake member thereby reducing the wear on the parts and friction which would result in heating.

The vanes are, as clearly shown in Fig. 1, struck out from the ring or body portion 26 and in effect form cup-like elements moving in the fluid in the chamber 5 and serving effectively to counteract the spring 21 and eliminating any wedging action by the rollers 13 between the roller raceway member 9 and the cams 12 of the cam member 10. By referring to Fig. 3 it will be seen that the cams 12 of the cam member 10 are so formed that if the rollers 13 are urged in an anti-clockwise direction they wedge between the cam member 10 and the fixed roller raceway 9 thereby preventing movement of the cam member 10 in a clockwise direction, while movement of the cam member 10 in an anti-clockwise direction relieves the wedging action thus allowing the cam member and rollers 8 to revolve in an anticlockwise direction. While so running the spring 21 through its connection with the roller cage 14 urges the rollers into wedging engagement with the fixed raceway 9, thereby causing undue friction between the rollers and the raceway. It is for the purpose of relieving this wedging action and to eliminate excessive friction between the rollers and raceway that the vaned member 26 is provided so that when it is rotated with the cam member 10 it causes a drag on the roller cage 14 which counteracts the action of the spring 21 and causes the cage 14 to be moved clockwise relative to the cam member, thereby removing the wedging action of the rollers as between the cam member and raceway.

In the embodiment of my invention shown in Figs. 4, 5 and 6, the fixed brake member 28 is in the form of an internal jaw member of the helical type while the coacting brake member 29 has helical jaw teeth 30 coacting therewith. The brake member 29 is splined to the shaft 31 which corresponds to the shaft 2, the shaft 32 corresponding to the shaft 1 in the embodiment shown in Fig. 1.

The spring member 33 having a plurality of spring fingers 34 is disposed to urge the movable brake member to engaging position. To disengage the movable brake member against the tension of the spring it is provided with a plurality of vanes 35 which, rotating in the fluid within the chamber 5, effectively overcome the action of the spring and insure the complete disengagement of the brake jaws and avoid the wear and friction which would normally result by the ends of the jaws sliding on each other. It will be understood that the jaws are pitched so that they tend to disengage when the movable brake member is rotated in one direction but complete disengagement and shifting out of contact is a very desirable feature which I accomplish by this embodiment of my invention.

I have illustrated and described my improvements in practical embodiments thereof. I have not attempted to illustrate or describe other embodiments or adaptations as it is believed that this disclosure will enable those skilled in the art to embody or adapt my invention as may be desired.

Having thus described my invention, what I claim as new and desire to secure by Letters Patent is:

1. In an overrunning brake, the combination with a housing, of a shaft provided with a bearing carried by said housing adapted as a fluid reservoir, an outer fixed raceway brake member carried by said housing, an inner cam member rotatable with said shaft, a plurality of rollers interposed between said fixed member and said cam member to cooperate with both, a roller cage operatively associated with said rollers and mounted on said cam member for limited rotating oscillating movement, an annular spring secured at one end to said cam member and at the other end to said cage and acting to urge the cage to roller engaging position, and vanes on said cage within said fluid reservoir acting on the rotation of the cam member to counteract the said spring.

2. In an overrunning brake, the combination with a housing having a fluid chamber, an outer fixed raceway brake member carried by said housing, an inner rotatable cam member, a plurality of rollers interposed between said fixed member and said cam member to cooperate therewith, a roller cage operatively associated with said rollers and mounted on said cam member for limited rotating movement relative thereto, a spring engaged at one end with said cam member and at the other end with said cage and acting to urge the cage to roller engaging position, and vanes on said cage within said fluid reservoir acting on the rotation of the cam member to counteract the said spring.

3. In a brake of the wedging roller type comprising a housing adapted as a fluid chamber and relatively fixed and rotatable brake elements and interposed coacting rollers, a cage for said rollers having a lost motion connection to the rotatable element, a spring acting to urge the rollers to engaged position, and vanes on said cage within said fluid chamber acting upon the rotation of the rotatable member to move the cage to roller retracting position.

4. In a brake of the wedging type comprising a housing adapted as a fluid chamber and relatively fixed and rotatable brake elements and coacting wedging elements, a cage for said wedging elements having a lost motion connection to the rotatable element, a spring acting to urge the wedging element to engaged position, and vanes on said cage within said fluid chamber acting upon the rotation of the rotatable member to move the cage to wedging element retracting position.

5. In an overrunning brake, the combination with a housing having a fluid chamber therein, of relatively fixed and rotatable brake members and rollers coacting therewith, a cage for said rollers having a lost motion connection to the movable member, and spring means acting on said cage, said cage being provided with vanes within said fluid chamber acting to overcome the spring as they are rotated with the rotating element.

6. In an overrunning brake, the combination with a housing having a fluid chamber therein, of relatively fixed and rotatable brake members and intermediate coupling elements coacting therewith, a carrier for said intermediate elements having a lost motion connection to the movable member, and spring means acting on said carrier, said carrier being provided with vanes within said fluid chamber acting to overcome the spring as they are rotated with the rotating element.

7. In an overrunning brake, the combination with a housing provided with a fluid chamber, of coacting relatively fixed and rotatable brake members, spring means acting to urge the brake members to engaged relation, and vanes within said fluid chamber acting upon the rotation of the rotatable brake member to disengage the brake.

8. In an overrunning brake, the combination with a housing having a fluid chamber therein, of relatively fixed and rotatable brake members, a spring acting to urge the brake members into brake engaging relation, and vanes within said fluid chamber and rotatable with said rotatable brake member acting to urge the rotatable brake member to disengaged position against the thrust of the spring.

HERBERT H. TRAIL.